(12) United States Patent
Maccone et al.

(10) Patent No.: US 6,746,620 B2
(45) Date of Patent: Jun. 8, 2004

(54) USE OF FLUORINATED LIQUIDS

(75) Inventors: Patrizia Maccone, Milan (IT); Rossella Silvani, Milan (IT)

(73) Assignee: Ausimont S.p.A., Milan (IT)

( * ) Notice: Subject to any disclaimer, the term of this patent is extended or adjusted under 35 U.S.C. 154(b) by 0 days.

(21) Appl. No.: 10/334,059

(22) Filed: Dec. 31, 2002

(65) Prior Publication Data

US 2003/0127623 A1 Jul. 10, 2003

(30) Foreign Application Priority Data

Jan. 8, 2002 (IT) ...................................... MI2002A0012

(51) Int. Cl.$^7$ .............................. C09K 5/10; C09K 5/00
(52) U.S. Cl. ...................... 252/70; 165/104.19; 252/71; 252/78.1
(58) Field of Search ........................... 252/70, 71, 78.1; 165/104.19

(56) References Cited

U.S. PATENT DOCUMENTS

| | | | |
|---|---|---|---|
| 3,704,214 A | 11/1972 | Sianesi et al. | |
| 3,715,378 A | 2/1973 | Sianesi et al. | |
| 3,907,955 A | 9/1975 | Viennot | |
| 5,969,192 A | 10/1999 | Marchionni et al. | |
| 6,610,250 B1 * | 8/2003 | Tuma | ........................ 422/38 |

FOREIGN PATENT DOCUMENTS

WO    WO 95/32174    11/1995

* cited by examiner

Primary Examiner—Anthony J. Green
(74) Attorney, Agent, or Firm—Arent Fox PLLC

(57) ABSTRACT

Use of one or more fluorinated liquids as dielectric working fluids in plants or heat transfer circuits comprising parts formed by polymer compound in contact with said fluids, said fluorinated liquids having:

boiling point in the range 50° C.–250° C., formula $$R'-R_f-R \qquad (I)$$

wherein:

R, $R_f$ and R' are as defined in the description.

12 Claims, No Drawings

USE OF FLUORINATED LIQUIDS

The present invention relates to the use of fluorinated compounds liquid at room temperature, as dielectric working fluids in plants or circuits comprising parts formed by organic polymer material in contact with said working fluids or fluorinated liquids.

Specifically the invention compounds show an improved property combination compared with the known working fluids of the prior art or industrially used, as indicated hereafter:
- reduced permeability and swelling of the polymer compounds with which they are in contact;
- capability to dissipate the electrostatic charges generated by triboelectric effect when they come into contact with non conductive polymer compounds.

It is well known that dielectric fluids are fluids which act as electric insulator, or such that an electric field can be maintained therein with a minimum dissipation of power.

As known, in the manufacture of equipments used in the chemical, pharmaceutical industry, of the heat exchangers (refrigeration), and in particular in the electric and electronic industry, organic polymer compounds, both plastomeric and elastomeric, are used in substitution of metals. Depending on the parts of the plant, fluorinated or hydrogenated polymer compounds can be used. In the parts subjected to thermal or mechanical stress, such for example in the pipe bundles of heat exchanger, fluorinated compounds are generally used. Other parts of the plant, for example, gaskets, O-ring, are made by hydrogenated or (per)fluorinated elastomeric compounds.

The substitution of metals with polymer compounds in plants and circuits used in the industry allows to obtain various advantages among which, for example, the removal from the working fluid of the metal particulate which forms due to the particle separation from the welding points, for example of the pipe bundles, and from the bent parts or connections of equipments particularly subjected to mechanical stresses. The metal particulate circulating with the working fluid can compromise the plant functionality, for example obstructing the flow regulation valves. Or it can compromise the dielectric properties of the working fluid, which are critical in the plants used in the electronic semicon industry.

Even though the use of polymer compounds in plants has favoured the solution of various problems, it is known that the compounds used in the prior art as working fluids can in the time compromise the properties of the organic polymer compound with which they are in contact.

The most significant drawbacks are the following:
(1) swelling of polymer parts with consequent loss of the mechanical properties of the manufactured article;
(2) permeation of the fluid through the compound, making it necessary the monitoring of the amount of fluid circulating in the plant to refill the losses;
(3) when the used polymer compounds are not conductive, an accumulation of electrostatic charges takes place on the manufactured article owing to the triboelectric effect if the working fluid has dielectric properties; under these conditions electric discharges can take place, even of an entity such to perforate the polymer material.

Said drawbacks compromise the plant efficiency and safety.

For said reasons in the plant construction for example of heat transfers, the choice of the suitable combination polymer compound—working fluid results critical, considering the width of the thermal cycle and the possible state transformations to which the fluid is subjected during its use.

In the prior art processes to dissipate electrostatic charges are described. For example in U.S. Pat. No. 3,907,955 a process to dissipate electrostatic charges, generated by the flow of fluids at high speed in circuits which are used in the aeronautic sector is described. According to the process of said patent the polymer compound used to manufacture the circuits (PTFE) is made conductive by the addition of graphite. Said addition shows the drawback that if a dielectric working fluid is used in the plant, it can be polluted by conductive particulate coming from the graphite used in the preparation of pipes and therefore lose the insulating properties. The same drawback takes place by using elastomeric compounds, which as well known are charged with fillers to confer mechanical properties. Also in this case the fillers during the use are extracted from the working fluid.

The need was felt to have available a dielectric working fluid, to be used in industrial circuits or plants, for example heat transfers, comprising parts made by polymer material, showing the following improved combination of properties:

reduced permeability, reduced swelling, good dissipation of electrostatic charges.

The Applicant has surprisingly and unexpectedly found compounds usable as dielectric working fluids, liquid at room temperature, which solve the above technical problem.

An object of the invention is the use of one or more fluorinated compounds, liquid at room temperature, as dielectric working fluids in plants or heat transfer circuits comprising parts formed by polymer compound in contact with said fluids, said liquids having boiling point in the range 50° C.–250° C., preferably 70° C.–200° C., and having formula

$$R'\text{—}R_f\text{—}R \qquad (I)$$

wherein:

R' is —(O)$_{n0}$—C$_n$F$_{2n}$H, n being an integer from 1 to 4, preferably 1 or 2; n0 is equal to 0, 1;

R is: —C$_n$F$_{2n}$H, —C$_m$F$_{2m+1}$; wherein
  in the end groups R, R' one fluorine atom is optionally substituted with one chlorine atom; n in R is as defined in R'; m is an integer from 1 to 3;

R$_f$ is:
  linear or branched perfluoroalkylene from 2 to 12 carbon atoms, containing at least one ether oxygen atom, when R$_f$ has said meaning n0 in R' is preferably equal to zero;
  perfluoropolyoxyalkylene comprising units statistically distributed along the chain, selected from the following:
    (CFXO) wherein X=F or CF$_3$;
    (CF$_2$(CF$_2$)$_d$O) wherein d is an integer comprised between 1 and 3;
    (C$_3$F$_6$O);
  when R$_f$ is perfluoropolyoxyalkylene n0 in R' is preferably equal to 1.

The unit (C$_3$F$_6$O) in R$_f$ has the following meanings:
(CF$_2$CF(CF$_3$)O), (CF(CF$_3$)CF$_2$O).

Preferably in formula (I) R is a group selected from the following: —CF$_2$H, —CF$_2$CF$_2$H, —CFHCF$_3$.

The working fluids, the above described compounds of formula (I), generally have a number average molecular weight from 200 to 800.

In the fluids of the invention of formula (I) preferably R$_f$=(per)fluoropolyether chain with n0 of R' equal to 1, R$_f$ preferably has one of the following structures:

1) $-(CF_2O)_a-(CF_2CF_2O)_b-$
   when a is different from zero, then b/a is comprised between 0.3 and 10, extremes included; when a is equal to zero b is an integer as defined below;
   R in formula (I)=$-C_nF_{2n}H$;
2) $-(CF_2-(CF_2)_{z'}-CF_2O)_{b'}-$
   wherein z' is an integer equal to 1 or 2; b' is as defined below;
3) $-(C_3F_6O)_r-(C_2F_4O)_b-(CFL_0O)_t-$
   $L_0=-F, -CF_3$;
   when b and t are different from zero r/b=0.5–2.0; (r+b)/t=10–30 and all the units with r, b and t indexes are present;
   or b=t=0 and r satisfy the proviso indicated below;
   or b=0 and r and t are different from zero; a, b, b', r, t, are integers such that, or whose sum is such that the compound of formula (I) containing the bivalent radical $R_f$ has a boiling point in the above range.

The dielectric fluids, or compounds of the invention, can be for example the following:

$HCF_2O(CF_2CF_2O)_{1.8}(CF_2O)_{1.4}CF_2H$;
$HCF_2O(CF_2CF_2O)_2(CF_2O)_{0.7}CF_2H$;
$HCF_2O(CF_2CF_2O)_3(CF_2O)_{0.4}CF_2H$;
$HCF_2O(CF_2CF_2O)_3(CF_2O)_{1.6}CF_2H$;
$HCF_2O(CF_2CF_2O)_4(CF_2O)_{0.9}CF_2H$;
$CF_3O(CF_2CF_2O)_2CF_2H$;
$CF_3O(CF_2CF_2O)_2(CF_2O)CF_2H$;
$CF_3O(CF_2CF(CF_3)O)_2CF_2H$;
$CF_3O(CF_2CF(CF_3)O)_3CF_2H$;
$CF_3O(C_3F_6O)_2(CF(CF_3)O)CF_2H$;
$HCF_2CF_2O(CF_2CF_2O)CF_2CF_2H$;
$HCF_2CF_2OCF_2C(CF_3)_2OCF_2CF_2CF2H$;
$CF_3(CF_2)_5OCF_2CF_2H$;
$CF_3(CF_2)_6OCF_2H$;
$C_5F_{11}OC_5F_{10}H$.

Preferably the used compounds are the following:
$HCF_2O(CF_2CF_2O)_3(CF_2O)_{0.4}CF_2H$;
$HCF_2O(CF_2CF_2O)_{1.8}(CF_2O)_{0.4}CF_2H$.

As said, according to the present invention the fluorinated liquids can be mixtures of the compounds of formula (I).

The fluorinated dielectric fluids can be prepared according to the methods described in U.S. Pat. Nos. 3,704,214, 3,715,378, patent application WO 95/32174 and U.S. Pat. No. 5,969,192.

As said the invention compounds show an optimal combination of low permeability and swelling in polymer compounds and capability to disperse the electrostatic charges present when the polymer compounds are not conductive.

It has resulted surprising and unexpected that the invention compounds show said improved combination of properties, since hydrofluoroethers containing in the molecule a perfluoroalkyl radical linked to a hydrogenated alkoxy group, for example $-OCH_3$, $-OC_2H_5$, give permeation values higher than or equal to the double in polymer compounds compared with the invention compounds having about the same boiling point. Besides, also the swelling is higher by using the above hydrofluoroether fluids of the prior art (see the Examples).

As said, the dielectric fluids of the present invention, compounds of formula (I) or mixtures thereof, can be used in plants or heat transfer circuits comprising parts formed by plastomeric and elastomeric polymer compounds, both fluorinated and hydrogenated. The properties of the fluids of the present invention allow their use even with non conductive polymer compounds. For example as polymer compounds for said circuits or plants, polymers or copolymers of tetrafluoroethylene and of vinylidene fluoride; polymers and copolymers of ethylene and propylene, EPDM, silicone rubbers, can be used.

The fluids of the present invention do not need the addition of antistatic agents since even though they are dielectric, it has been found that they are capable to disperse the electrostatic charges present in non conductive polymer compounds. This result is unexpected since perfluoropolyether compounds used as dielectric working fluids in heat transfer circuits are unable to disperse the electrostatic charges. This is the drawback shown by said working fluids commercially well known in said application.

The use according to the present invention is carried out by making the circuit or the plant to work by circulation in the pipes of the above fluorinated liquids.

The fluids of the present invention are not flammable, have ODP (ozone depletion potential) zero, low GWP (global warming potential) and reduced residence times in the atmosphere.

Some illustrative Examples follow which are not limitative of the present invention.

EXAMPLES

Triboelectric Measurements

The determination is carried out by using an equipment consisting of a fluid tank, a circulating pump with flow regulation valve and 1 metre long PTFE pipe having diameter of 8 mm. The flow rate is 300 litres/h. The flow regulation valve must allow a continuous flowing of the tested fluid through the PTFE pipe. The tank is filled with the tested fluid. By means of a voltmeter placed at a definite distance from the PTFE pipe the electrostatic charge is determined on the pipe at zero time and subsequently at determined intervals during the fluid flowing.

The obtained result is expressed in per cent ratio between the charge determined on the pipe at the considered time and that determined at the starting of the test.

Permeability Measurements

The fluid permeability has been determined by the following gravimetric methods:

Method I

In a cup having diameter of 5 cm, 50 cc of the tested fluid are introduced. A polymer plaque of which one wishes to determine the permeability to fluid, compression moulded having nominal tickness of 300 $\mu$m, is positioned and fastened on the cup by a proper flange. The cup is overturned to put the liquid into contact with the polymer, and transferred in a thermostated stove at the required temperature. A light $N_2$ flow is directed on the free surface of the plaque. At prefixed time intervals, the cup is transferred on a precision balance and weighed. By difference with the initial weight, the weight loss due to the flowing of the solvent permeated through the polymer, is calculated.

The result is expressed in $g_{permeate}/(24 \text{ h·m}^2$. The results of different tests can be compared each other by normalizing them taking into account the plaque thickness.

Therefore the final permeability coefficient is usually expressed in $g_{permeate} \cdot \text{mm}/(24 \text{ h·m}^2)$.

Method II

A phial having the capacity of about 5 cc, formed by the polymer compound of which one wishes to determine the permeability, is filled with the tested liquid and then thermowelded so that it is hermetically sealed. The phial is transferred in a dryer for 30 minutes and then in a stove at the test temperature. After 300 hours the phial is taken away from the stove and conditioned in the dryer at room temperature for 30 minutes and then weighed.

The test result is expressed as variation per cent by weight ($\Delta P/P$)×100 wherein P is the phial initial weight. This ratio represents the fluid loss due to the permeation normalized for the total initial weight of the phial. The method precision is about 0.03%.

Determination of the Polymer Compound Swelling

The polymer compound swelling has been determined according to ASTM D 471 by dipping the specimens in the tested fluid. Two tests have been carried out, at 100° C. and 80° C. respectively. The treatment time was of 72 hours. The specimen swelling is expressed by the following ratio:

$$\frac{[(weight_{after\ dipping}) - (weight_{initial})]}{weight_{initial}} \times 100$$

Example 1
Triboelectric Measurements of a Compound of the Invention of Formula (I)

A fluid of the invention commercially known with the name H-Galden® ZT130, having the following formula:

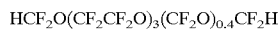

HCF$_2$O(CF$_2$CF$_2$O)$_3$(CF$_2$O)$_{0.4}$CF$_2$H and the following chemico-physical properties:

| | |
|---|---|
| Boiling point | 130° C. |
| Pour point | −115° C. |
| Kinematic viscosity at 25° C. | 0.89 cSt (8.9 · 10$^5$ m$^2$/s) |
| Dielectric constant at 25° C. (at 1 KHz) | 3.6 |
| Dielectric rigidity (gap 2.54 mm) | 37.9 kV | has been introduced in the tank of the above described equipment and let circulate in the PTFE pipe for one hour. The charge decrease on the pipe was 96%.

Example 2 (Comparative)
Triboelectric measurements on a perfluoropolyether compound having the same boiling point of the fluid used in Example 1.

The perfluoropolyether compound, commercially known as Galden® HT135, was used, having formula:

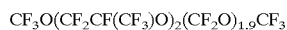

CF$_3$O(CF$_2$CF(CF$_3$)O)$_2$(CF$_2$O)$_{1.9}$CF$_3$ and the following chemical-physical properties:

| | |
|---|---|
| Boiling point | 135° C. |
| Pour point | <−100° C. |
| Kinematic viscosity at 25° C. | 1 cSt |
| Dielectric constant at 25° C. (at 1 KHz) | 2.1 |
| Dielectric rigidity (gap 2.54 mm) | 40 kV |

The liquid has been introduced in the tank of the above described equipment and let circulate in the PTFE pipe for some hours. After the first hour an increase of the electrostatic charges of about 8 times with respect to the initial value, and after 5 hours of about 16 times, was recorded on the PTFE pipe.

Example 3
Permeability measurements according to the Method I with a fluid of the invention using as polymer compound PVDF A fluid commercially known with the name of H-Galden® ZT85 is used, having the following formula:

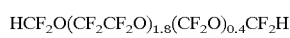

HCF$_2$O(CF$_2$CF$_2$O)$_{1.8}$(CF$_2$O)$_{0.4}$CF$_2$H having boiling point of 85° C.

The plaque is formed by polymer compound PVDF MP20®. The test has been carried out at the temperature of 40° C. The permeability coefficient resulted of 0.3 g·mm/24 h·m$^2$.

Example 4 (Comparative)
Permeability measurements according to the method I with a comparative fluid by using the same polymer compound of Example 3.

Example 3 was repeated by using as a fluid a compound commercially known with the name HFE® 7200 having formula C$_4$F$_9$OC$_2$H$_5$, with boiling point of 78° C. The plaque was equal to that used in Example 3. The permeability coefficient resulted of 2.5 g·mm/24 h·m$^2$.

This Example shows that a hydrofluoroether fluid having in the molecule a perfluoroalkyl radical linked to a hydrogenated alkoxy group shows a permeability value clearly higher than that of a hydrofluoroether according to the present invention having a comparable boiling point.

Example 5
Permeability measurements according to the method I using a working fluid according to the present invention, using as polymer compound PFA.

The same hydrofluoroether of Example 3 is used as working fluid.

The plaque is formed by polymer compound TEFLON® PFA 350. The test has been carried out at the temperature of 40° C. The permeability coefficient resulted of 1.5 g·mm/24 h·m$^2$.

Example 6 (Comparative)
Permeability measurements according to the method I with a comparative fluid, using the same polymer compound of Example 5.

Example 5 was repeated using as working fluid the hydrofluoroether compound of Example 4 (comparative), using a plaque equal to that of Example 5. The permeability coefficient resulted of 3.1 g·mm/24 h·m$^2$.

The above comments referred to the results obtained in Example 3 and Example 4 (comparative) can be repeated.

Example 7
Permeability measurements according to the method II with a fluid of the invention, using as polymer compound polyethylene.

The same fluid used in Example 1 is used. The test was carried out at the temperature of 60° C. The variation by weight of the fluid, due to permeation, calculated as above, is 1%.

Example 8 (Comparative)
Permeability measurements according to the method II with a comparative fluid, using the same polymer compound of Example 7.

Example 7 has been repeated using as fluid a compound commercially known with the name HFE® 7500 having formula C$_7$F$_{15}$OC$_2$H$_5$ and boiling point of 128° C.

The test has been carried out at the temperature of 60° C. The variation by weight of the fluid, due to permeation, calculated as above indicated, is 2%.

Example 9
Determination of the swelling of a polymer compound for gaskets made by cured silicone rubber put into contact with a fluid according to the present invention.

The fluid described in Example 1 (b.p. 130° C.) has been used, employing silicone rubber plaques having a nominal thickness of 0.8 mm.

The test temperature was of 100° C. The swelling percentage was 4%.

Example 10 (Comparative)

Determination of the swelling of a polymer compound for gaskets made by cured silicone rubber put into contact with a hydrofluoroether fluid of the prior art.

Example 9 has been repeated using the fluid described in Example 8 (comparative) having b.p. of 128° C.

The swelling percentage was 16%.

Example 11

Determination of the swelling of a polymer compound for gaskets made by cured silicone rubber put into contact with a fluid according to the present invention.

The fluid described in Example 3 was used, (b.p. 85° C.) using silicone rubber plaques having a nominal thickness of 0.8 mm.

The test temperature was 80° C. The swelling percentage was 8%.

Example 12 (Comparative)

Determination of the swelling of a polymer compound for gaskets made by cured silicone rubber put into contact with a hydrofluoroether fluid of the prior art.

Example 11 has been repeated using the fluid described in Example 4 (comparative), having b.p. of 78° C.

The swelling percentage was 50%.

What is claimed is:

1. A process for heat transfer by utilizing one or more fluorinated liquids as dielectric working fluids in plants or heat transfer circuits comprising parts formed by polymer material in contact with said fluids, said fluorinated liquids having:

a boiling point in the range of 50° C.–250° C.

reduced permeability and reduced swelling properties for the polymer materials which contact said fluorinated liquids in a heat transfer apparatus;

good dissipation of electrostatic charges generated when said fluorinated dielectric liquids contact non conductive polymer parts of the heat transfer apparatus; and chemical formula $$R'—R_f—R \quad (I)$$

wherein:
   R' is $—(O)_{n0}—C_nF_{2n}H$, n being an integer from 1 to 4, n0 is equal to 0 or 1;
   R is: $—C_nF_{2n}H$, or $—C_mF_{2m+1}$ wherein n is as above defined and m is an integer from 1 to 3:
   in the end groups R, R' one fluorine atom is optionally substituted with one chlorine atom;
   $R_1$ is: 
   a linear or branched perfluoroalkylene from 2 to 12 carbon atoms, containing at least one ether oxygen atom; when $R_f$ has said meaning n0 in R' is preferably equal to zero;
   a perfluoropolyoxyalkylene comprising units statistically distributed along the chain, selected from the following:
   (CFXO) wherein X=F or $CF_3$;
   $(CF_2(CF_2)_dO)$ wherein d is an integer comprised between 1 and 3; or
   a unit $(C_3F_6O)$;
   when $R_f$ is perfluoropolyoxyalkylene n0 in R' is equal to 1.

2. The process according to claim 1, wherein the unit $(C_3F_6O)$ in $R_f$ comprises: $(CF_2CF(CF_3)O)$ or $(CF(CF_3)CF_2O)$.

3. The process according to claim 1, wherein in formula (I) R is a group selected from the following: $—CF_2H$, $—CF_2CF_2H$, or $—CFHCF_3$.

4. The process according to claim 1, wherein the compounds of formula (I), have a number average molecular weight from 200 to 800.

5. The process according to claim 1, wherein when $R_f$=(per) fluoropolyether chain, n0 in R'=1, and $R_f$ in R'—$R_f$—R has one of the following structures:

1) $—(CF_2O)_a—(CF_2CF_2O)_b—$
      when a is different from zero, then b/a is from 0.3 to 10, when a is equal to zero b is an integer as defined below;
      R in formula (I)=$—C_nF_{2n}H$;
   2) $—(CF_2—(CF_2)_{z'}—CF_2O)_{b'}$.
      wherein z' is an integer equal to 1 or 2; b' is as defined below;
   3) $—(C_3F_6O)_r—(C_2F_4O)_b—(CFL_0O)_t—$
      $L_0$=$—F$ or $—CF_3$;
      when b and t are different from zero r/b=0.5–2.0; (r+b)/t=10–30 and all the units with r, b and t indexes are present; or
      b=t=0 and r is different from zero satisfy the proviso indicated below; or
      b=0 and r and t are different from zero; with the proviso that a, b, b', r, and t, are integers, whose sum is such that the compound of formula (I) has a boiling point in the above range.

6. The process according to claim 1, wherein the compounds of formula (I) are selected from the following:
   $HCF_2O(CF_2CF_2O)_{1.8}(CF_2O)_{1.4}CF_2H$;
   $HCF_2O(CF_2CF_2O)_2(CF_2O)_{0.7}CF_2H$;
   $HCF_2O(CF_2CF_2O)_3(CF_2O)_{0.4}CF_2H$;
   $HCF_2O(CF_2CF_2O)_3(CF_2O)_{1.6}CF_2H$;
   $HCF_2O(CF_2CF_2O)_4(CF_2O)_{0.9}CF_2H$;
   $CF_3O(CF_2CF_2O)_2CF_2H$;
   $CF_3O(CF_2CF_2O)_2(CF_2O)CF_2H$;
   $CF_3O(CF_2CF(CF_3)O)_2CF_2H$;
   $CF_3O(CF_2CF(CF_3)O)_3CF_2H$;
   $CF_3O(C_3F_6O)_2(CF(CF_3)O)CF_2H$;
   $HCF_2CF_2O(CF_2CF_2O)CF_2CF_2H$;
   $HCF_2CF_2OCF_2C(CF_3)_2CF_2OCF_2CF_2H$;
   $CF_3(CF_2)_5OCF_2CF_2H$;
   $CF_3(CF_2)_6OCF_2H$; or
   $C_5F_{11}OC_5F_{10}H$.

7. The process according to claim 6, wherein the compounds of formula (I) are selected from the following:
   $HCF_2O(CF_2CF_2O)_3(CF_2O)_{0.4}CF_2H$; or
   $HCF_2O(CF_2CF_2O)_{1.8}(CF_2O)_{0.4}CF_2H$.

8. The process according to claim 1, wherein the fluorinated liquids are constituted by mixtures of the compounds of formula (I).

9. The process according to claim 1, carried out in the plants or heat transfer circuits which comprise parts formed by fluorinated and/or hydrogenated polymer compounds.

10. The process according to claim 9, wherein the polymer compounds are formed by polymers or copolymers of tetrafluoroethylene and of vinylidene fluoride; polymers and copolymers of ethylene and propylene, EPDM, silicone rubbers.

11. The process according to claim 1, wherein the boiling point is in the range of 70° C.–200° C.

12. The process according to claim 1, wherein n is 1 or 2.

* * * * *